United States Patent
El-Eskandarany

(10) Patent No.: US 9,533,884 B1
(45) Date of Patent: Jan. 3, 2017

(54) COMPOSITION FOR HYDROGEN STORAGE

(71) Applicant: KUWAIT INSTITUTE FOR SCIENTIFIC RESEARCH, Safat (KW)

(72) Inventor: Mohamed Sherif Mohamed Mostafa El-Eskandarany, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 15/163,597

(22) Filed: May 24, 2016

(51) Int. Cl.
    *C01B 6/04* (2006.01)
    *B01J 23/89* (2006.01)
    *C01B 3/00* (2006.01)

(52) U.S. Cl.
    CPC ............ *C01B 3/0078* (2013.01); *B01J 23/892* (2013.01); *C01B 3/0042* (2013.01)

(58) Field of Classification Search
    CPC .............................. B01J 23/892; C01B 3/0031
    See application file for complete search history.

(56) References Cited

U.S. PATENT DOCUMENTS

| | | | |
|---|---|---|---|
| 6,413,670 | B1 | 7/2002 | Ovshinsky et al. |
| 8,481,151 | B2 | 7/2013 | Uchiyama et al. |
| 8,871,671 | B2 | 10/2014 | Uchiyama et al. |

FOREIGN PATENT DOCUMENTS

| | | |
|---|---|---|
| CN | 101733155 A | 6/2010 |
| CN | 102910586 A | 2/2013 |
| CN | 103183312 A | 7/2013 |

OTHER PUBLICATIONS

Babu et al., "Magnesium Hydrides for Hydrogen Storage: A Mini Review," International Journal of ChemTech Research, vol. 6, No. 7, pp. 3451-3455, Sep.-Oct. 2014.

*Primary Examiner* — Peter F Godenschwager
(74) *Attorney, Agent, or Firm* — Richard C. Litman

(57) ABSTRACT

The composition for hydrogen storage is a composite of $MgH_2$ powder and a metallic glassy $Zr_{70}Ni_{20}Pd_{10}$ powder. Preferably, the metallic glassy $Zr_{70}Ni_{20}Pd_{10}$ powder forms about 5 wt % of the composition for hydrogen storage. The composition for hydrogen storage is prepared by mixing $MgH_2$ powder and $Zr_{70}Ni_{20}Pd_{10}$ powder to form a mixture, and then performing reactive ball milling on the mixture. Preferably, the reactive ball milling is performed under 50 bar of hydrogen gas atmosphere for a period of 50 hours.

7 Claims, 9 Drawing Sheets

COMPOSITION FOR HYDROGEN STORAGE

BACKGROUND OF THE INVENTION

1. Field of the Invention

The present invention relates to hydrogen storage, and particularly to a composite powder for hydrogen storage including $MgH_2$ powder and a $Zr_{70}Ni_{20}Pd_{10}$ powder.

2. Description of the Related Art

Magnesium hydride ($MgH_2$) has been widely studied with regard to its use as a hydrogen storage medium. $MgH_2$ readily reacts with water to form hydrogen gas: $MgH_2 + 2H_2O \rightarrow 2H_2 + Mg(OH)_2$. However, $MgH_2$ requires high temperatures (287° C.) to produce $H_2$ at 1 bar pressure. As such, there is significant interest in improving the hydrogenation and dehydrogenation reaction kinetics of $MgH_2$. Prior efforts in improving the hydrogenation and dehydrogenation reaction kinetics of $MgH_2$ have not resulted in significant improvement and/or generally required the usage of complex and costly additional machinery and equipment.

Thus, a composition for hydrogen storage solving the aforementioned problems is desired.

SUMMARY OF THE INVENTION

A composition for hydrogen storage includes $MgH_2$ powder and a metallic glassy $Zr_{70}Ni_{20}Pd_{10}$ powder. Preferably, the metallic glassy $Zr_{70}Ni_{20}Pd_{10}$ powder forms about 5 wt % of the composition for hydrogen storage. The composition can be a uniform composite powder including $MgH_2$ nanoclusters embedded into a $Zr_{70}Ni_{20}Pd_{10}$ matrix. The composition for hydrogen storage is prepared by mixing $MgH_2$ powder and $Zr_{70}Ni_{20}Pd_{10}$ powder to form a powdered mixture, and then performing reactive ball milling on the powdered mixture. Preferably, the reactive ball milling is performed under 50 bar of hydrogen gas atmosphere for a period of 50 hours.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
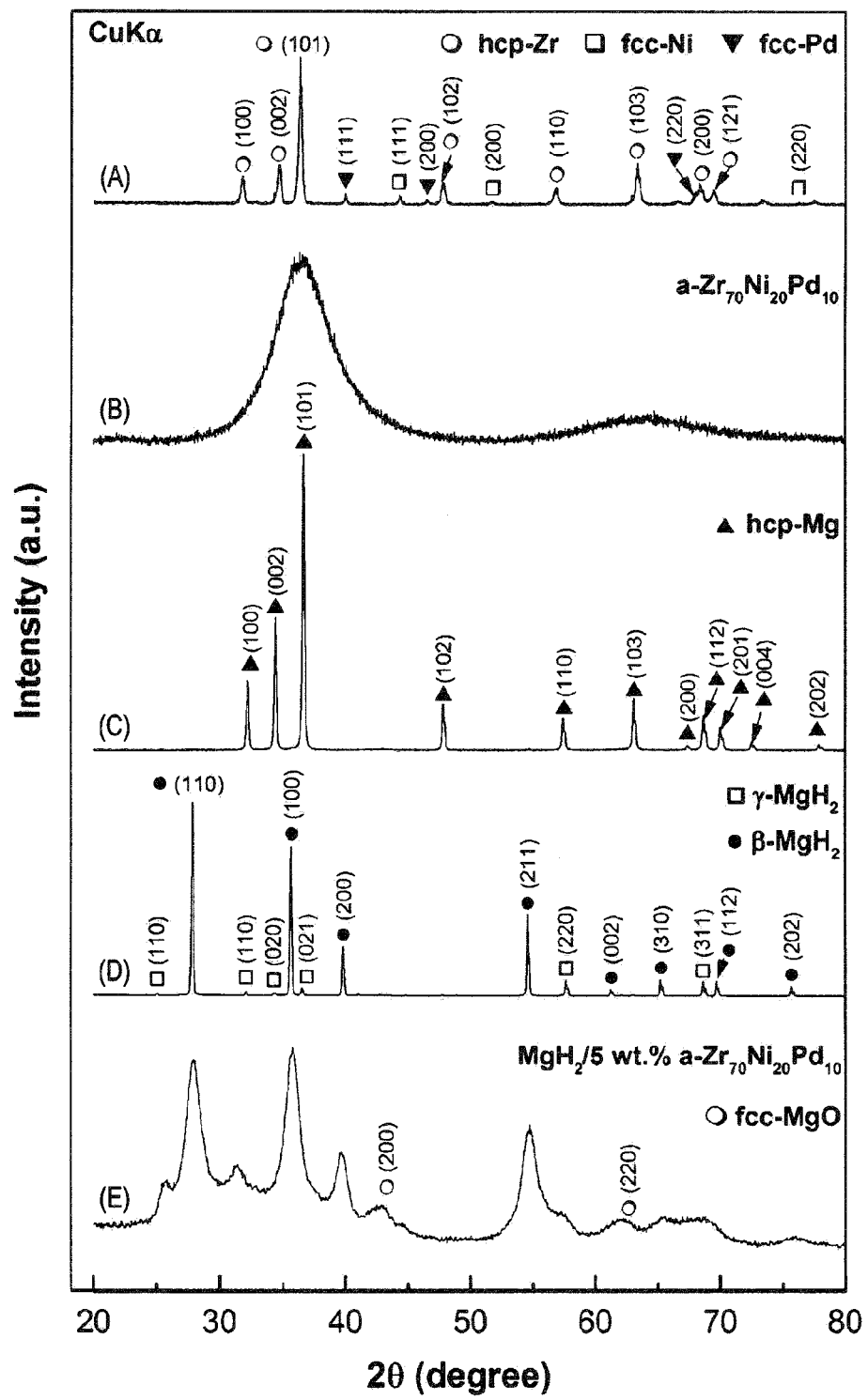
FIG. 1 shows the X-ray diffraction (XRD) pattern for a metallic glassy $Zr_{70}Ni_{20}Pd_{10}$ powder ball milled for one hour (curve (A)) compared against XRD patterns for the metallic glassy $Zr_{70}Ni_{20}Pd_{10}$ powder ball milled for 25 hours (curve (B)), pure magnesium (Mg) powder (curve (C)), magnesium powder after 6 hours of ball milling in $H_2$ gas atmosphere (curve (D)), and a composition for hydrogen storage according to the present invention, prepared by 50 hours of ball milling of the $Zr_{70}Ni_{20}Pd_{10}$ powder and $MgH_2$ powder (curve (E)).

A composition for hydrogen storage includes $MgH_2$ powder and $Zr_{70}Ni_{20}Pd_{10}$ powder. The $Zr_{70}Ni_{20}Pd_{10}$ powder can be a metallic, glassy powder. Preferably, the $Zr_{70}Ni_{20}Pd_{10}$ powder forms about 5 wt % of the composition for hydrogen storage. The hydrogenation/dehydrogenation temperature of the composition can range from about 100° C. to 200° C. The time for hydrogen charging/discharging can range from about 1 minute to about 4 minutes, e.g., 1.18 minutes to 3.8 minutes. As will be described in greater detail below, the composition for hydrogen storage is prepared by mixing $MgH_2$ powder and $Zr_{70}Ni_{20}Pd_{10}$ powder to form a powdered mixture, and then performing reactive ball milling on the powdered mixture. Preferably, the reactive ball milling is performed under 50 bar of hydrogen gas atmosphere for a period of 50 hours.

The present inventors have found that combining $Zr_{70}Ni_{20}Pd_{10}$ powder with $MgH_2$ powder as described herein improves the hydrogenation/dehydrogenation behavior of $MgH_2$. For example, the decomposition temperature of MgH$_2$ can be lowered from 462.75° C. to 341.6° C. when used in combination with Zr$_{70}$Ni$_{20}$Pd$_{10}$ as described herein.

The Zr$_{70}$Ni$_{20}$Pd$_{10}$ powder can be prepared by first mixing zirconium (Zr) powders, nickel (Ni) powders, and palladium (Pd) powders to provide a starting powdered mixture of Zr$_{70}$Ni$_{20}$Pd$_{10}$. The starting Zr powder can have a particle size of about 150 µm in diameter. The starting Ni powder can have a particles size of about 20 µm in diameter. The starting Pd powder can have a particle size of about 10 µm in diameter. The starting powdered mixture can be ball milled to produce the metallic glassy Zr$_{70}$Ni$_{20}$Pd$_{10}$ powder. MgH$_2$ powder can then be doped with about 5 wt % of the metallic glassy Zr$_{70}$Ni$_{20}$Pd$_{10}$ powder. The MgH$_2$ powder can be prepared by balancing an amount of Mg powder in a He gas atmosphere prior to introducing H$_2$ gas to the powder. The particle size of the MgH$_2$ powder can be reduced by reactive ball milling (RBM).

For example, the metallic glassy Zr$_{70}$Ni$_{20}$Pd$_{10}$ powder was prepared by mixing pure zirconium (Zr), nickel (Ni) and palladium (Pd) in a helium gas atmosphere glove box (i.e., a dry box). An initial amount of 5 g of Zr$_{70}$Ni$_{20}$Pd$_{10}$ powder was sealed in a FeCr-steel vial with two FeCr-stainless steel balls (10 mm in diameter) with a ball-to-powder weight ratio of 10:1. Ball mixing was then carried out at a frequency of 25 Hz for 25 hours using a high energy ball mill. The resultant mixed powder was discharged back into the helium gas atmosphere glove box.

The MgH$_2$ powder was prepared by sealing 5 g of magnesium (Mg) inside a hardened steel vial (220 mL volume) with 25 hardened steel balls. The ball-to-powder weight ratio was 40:1. The atmosphere in the vial was evacuated to $10^{-3}$ bar pressure before introducing H$_2$ gas. The vial was filled with H$_2$ gas to reach a pressure of 50 bar. Reactive ball milling was then carried out at room temperature using a high energy ball mill. After six hours of reactive ball milling, the MgH$_2$ powder was then extracted and sealed in vials.

The prepared MgH$_2$ powder was mixed with the Zr$_{70}$Ni$_{20}$Pd$_{10}$ powder (5 wt %) in the helium gas atmosphere glove box using an agate mortal and pestle. The mixture was then sealed in a hardened steel vial with 40 hardened steel balls under a helium gas atmosphere. The vial was then filled with 50 bar pressure of H$_2$ gas and mounted on the high energy ball mill. Different samples were prepared for ball milling times of 10 hours, 20 hours, 30 hours, 40 hours and 50 hours.

The crystal structure of each sample was investigated by X-ray diffraction (XRD) with CuKα radiation using a 9 kW X-ray diffraction system. The local structure of the synthesized material powders was studied by 200 kV-field emission high resolution transmission electron microscopy/scanning transmission electron microscopy (HRTEM/STEM). Additionally, differential scanning calorimetry (DSC)/differential thermal analysis (DTA) (with a heating rate of 20° C./min) was employed to investigate the glass transition temperature, and the thermal stability indexed by the crystallization temperature and enthalpy change of crystallization for the metallic glassy powders. A thermal analysis system using differential scanning calorimetry was used to investigate the decomposition temperatures of the composite powders (with a heating rate of 20° C./min). Hydrogen absorption/desorption kinetics were investigated using Sievert's method under a hydrogen gas pressure ranging between 200 mbar and 10 bar. Samples were examined at differing temperatures of 100° C., 125° C., 150° C., 175° C., and 200° C.

FIG. 1 shows the X-ray diffraction (XRD) pattern for the metallic glassy Zr$_{70}$Ni$_{20}$Pd$_{10}$ powder ball milled for one hour (curve (A)) compared against XRD patterns for the metallic glassy Zr$_{70}$Ni$_{20}$Pd$_{10}$ powder ball milled for 25 hours (curve (B)), pure magnesium (Mg) powder (curve (C)), magnesium powder after 6 hours of ball milling in H$_2$ gas atmosphere (curve (D)), and the composition for hydrogen storage, prepared by 50 hours of ball milling of the Zr$_{70}$Ni$_{20}$Pd$_{10}$ powder and the MgH$_2$ powder (curve (E)). In curve (A), the Zr$_{70}$Ni$_{20}$Pd$_{10}$ powder consisted of a polycrystalline mixture of hcp-Zr (70 at. %), fcc-Ni (20 at. %), and fcc-Pd (10 at. %). When the mixed powders were subjected to continuous ball milling in an argon gas atmosphere, the sharp Bragg peaks shown in curve (A) disappeared and were replaced by a halo-diffuse pattern of an amorphous phase, as seen in curve (B).

Figure 2A:
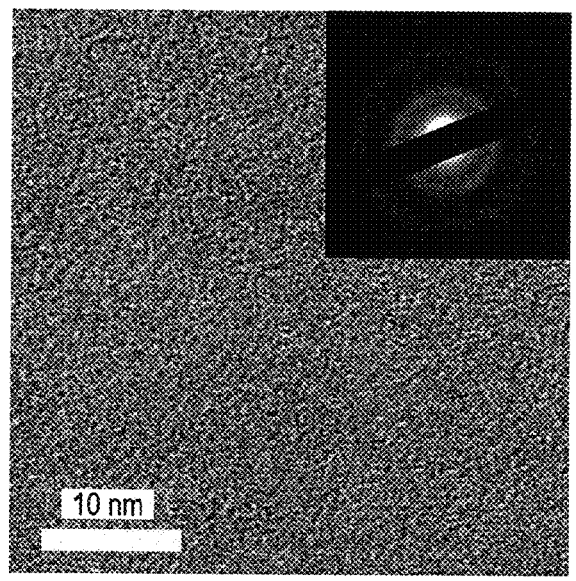
FIG. 2A is a high resolution transmission electron microscopy (HRTEM) image of the metallic glassy $Zr_{70}Ni_{20}Pd_{10}$ powder ball milled for 25 hours.

FIG. 2A is a high resolution transmission electron microscopy (HRTEM) image of the metallic glassy Zr$_{70}$Ni$_{20}$Pd$_{10}$ powder obtained after ball milling a mixture of Zr/Ni/Pd powders for 25 hours using a high-energy ball mill. The maze-like structure without any indication of precipitation of unprocessed crystals suggests the formation of a single amorphous phase. The included nanobeam diffraction pattern (NBDP) taken from the center of the image shows a clear halo-diffraction pattern, which is typical of an amorphous phase.

Returning to FIG. 1, the XRD patterns show sharp Bragg-diffraction peaks related to hcp-Mg in curve (C). After six hours of reactive ball milling (RBM), a new set of Bragg-peaks were obtained (curve (D)), in which all of the Bragg-lines corresponding to hcp-Mg disappeared, suggesting the formation of a new phase. These new Bragg-peaks indicate the formation of polycrystalline γ-MgH$_2$ and β-MgH$_2$ phases with orthorhombic and tetragonal structures, respectively.

Figure 2B:
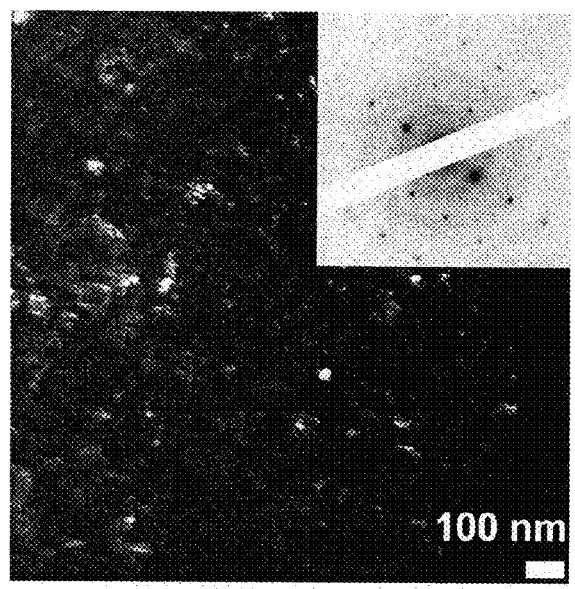
FIG. 2B is a dark field image (DFI) of the composition for hydrogen storage according to the present invention, prepared by 10 hours of ball milling of the $Zr_{70}Ni_{20}Pd_{10}$ powder and $MgH_2$ powder.

The composite powders with 5 wt % Zr$_{70}$Ni$_{20}$Pd$_{10}$ powder prepared after 10 hours of reactive ball milling contained irregular morphologies of MgH$_2$ grains with a large grain size distribution (38 nm-324 nm), as shown in the dark field image (DFI) of FIG. 2B. The grains are embedded in the amorphous matrix particle, forming the composite powder. The included selected area diffraction pattern (SADP) shows overlapped sport patterns of large MgH$_2$ grains which are overlapped with a halo-diffraction pattern, resulting from the amorphous matrix.

Figure 2C:
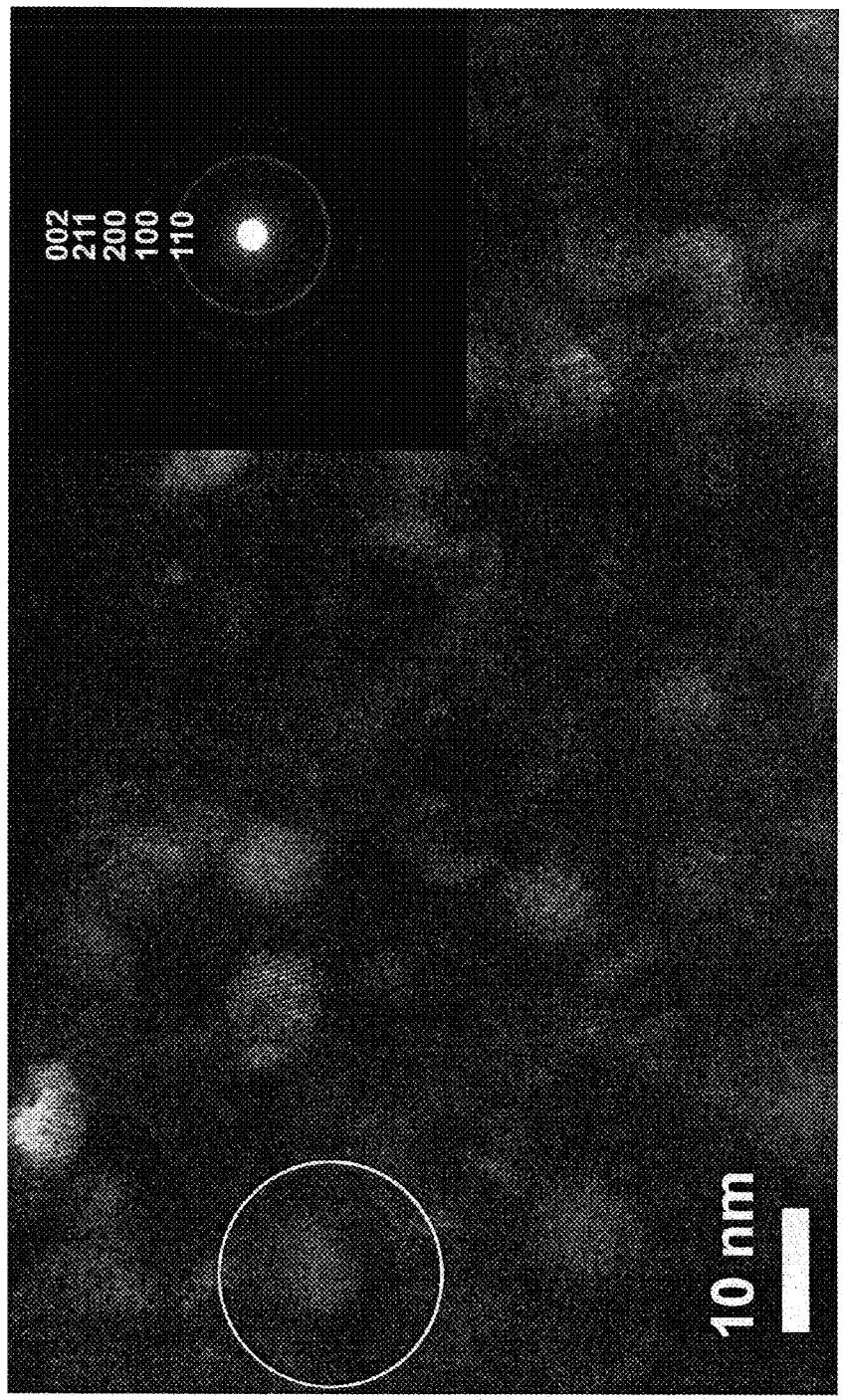
FIG. 2C is a dark field image (DFI) of the composition for hydrogen storage according to the present invention, prepared by 30 hours of ball milling of the $Zr_{70}Ni_{20}Pd_{10}$ powder and $MgH_2$ powder.

Increasing the RMB time to 30 hours leads to a dramatic decrease in the MgH$_2$ crystal sizes, ranging between 8 nm and 10 nm in diameter, as shown in the DFI of FIG. 2C. After this stage of milling, the MgH$_2$ possesses excellent morphological characterizations, indexed by a near-spherical morphology without the existence of flake and/or bulk morphologies, as shown in FIG. 2C. The NBDP included in FIG. 2C is taken from the indexed circular shape, showing a continuous Debye-ring diffraction pattern of β-MgH$_2$ phase with an absence of sharp spots. This implies the formation of nanocrystalline grains embedded in the amorphous matrix.

Curve (E) of FIG. 1 shows the XRD pattern for the composite powder with 5 wt % of amorphous Zr$_{70}$Ni$_{20}$Pd$_{10}$ powder obtained after 50 hours of ball milling. The primary and secondary haloes become very broad without any indication of medium or long-range ordered structures. Further, the Bragg-diffraction peaks related to MgH$_2$ (γ and β phases) show significant broadening, indicating the effect of RBM time on grain refining and formation of nanocrystallites. The Bragg peaks in curve (E), which are related to fcc-MgO phase, come from the oxidation of the powder surfaces during preparation of the XRD sample outside the helium atmosphere glove box.

Figure 3:
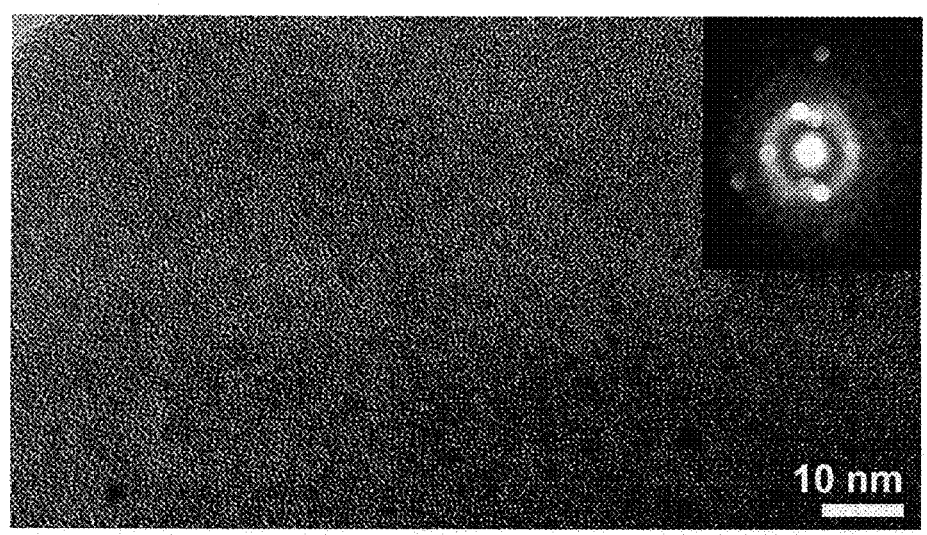
FIG. 3 is a high resolution transmission electron microscopy (HRTEM) image of the composition for hydrogen storage according to the present invention, prepared by 50 hours of ball milling of the $Zr_{70}Ni_{20}Pd_{10}$ powder and $MgH_2$ powder.

FIG. 3 is a high resolution transmission electron microscopy (HRTEM) image of the composition for hydrogen storage resulting from 50 hours of ball milling of the $Zr_{70}Ni_{20}Pd_{10}$ powder and $MgH_2$ powder. Spherical $MgH_2$ nanoclusters can be seen homogenously embedded in the featureless, amorphous $Zr_{70}Ni_{20}Pd_{10}$ matrix, forming a uniform composite powder. These nano-spherical grains are segregated and "floating into a pool" of randomly distributed amorphous atoms. The included NBDP shows a halo-diffraction pattern of amorphous $Zr_{70}Ni_{20}Pd_{10}$ coexisting with a spot-like pattern, which comes from nanocrystalline γ and β $MgH_2$ phases oriented in different axial directions.

Figure 4:
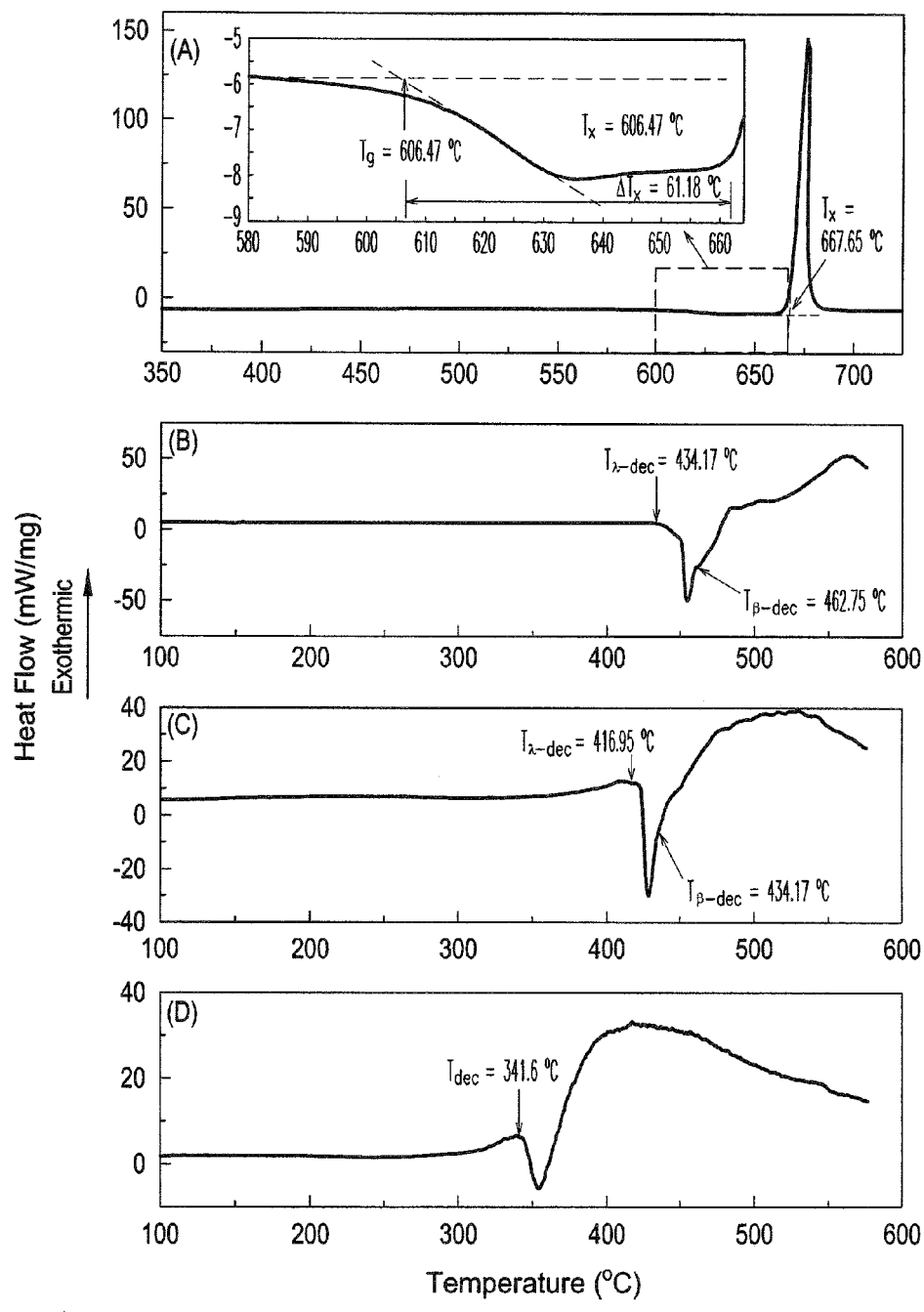
FIG. 4 shows differential scanning calorimetry (DSC) curves for a metallic glassy $Zr_{70}Ni_{20}Pd_{10}$ powder obtained after 25 hours of ball milling time (curve (A)) compared against $MgH_2$ powder obtained after six hours of reactive ball milling (curve (B)), the composition for hydrogen storage according to the present invention, prepared by 10 hours of ball milling of the $Zr_{70}Ni_{20}Pd_{10}$ powder and $MgH_2$ powder (curve (C)), and the composition for hydrogen storage according to the present invention, prepared by 50 hours of ball milling of the $Zr_{70}Ni_{20}Pd_{10}$ powder and $MgH_2$ powder (curve (D)).

Differential scanning calorimetry (DSC) performed at a heating rate of 20° C. under a helium gas flow of 75 mL/min was employed in order to investigate the crystallization properties of the amorphous matrix powders and the decomposition behavior of $MgH_2$ powders. FIG. 4 shows DSC curves for the metallic glassy $Zr_{70}Ni_{20}Pd_{10}$ powder obtained after 25 hours of ball milling time (curve (A)) compared against $MgH_2$ powder obtained after six hours of reactive ball milling (curve (B)), the composition for hydrogen storage prepared by 10 hours of ball milling of the $Zr_{70}Ni_{20}Pd_{10}$ powder and $MgH_2$ powder under 50 bar of $H_2$ pressure (curve (C)), and the composition for hydrogen storage according to the present invention, prepared by 50 hours of ball milling of the $Zr_{70}Ni_{20}Pd_{10}$ powder and $MgH_2$ powder under 50 bar of $H_2$ pressure (curve (D)). Curve (A) of FIG. 4 shows two reaction events taking place at onset temperatures of 606.47° C. (shown in a different scale inset of the Figure) and 667.65° C. The first event is an endothermic reaction related to the glass transition temperature ($T_g$), which is related to the form glassy phase, and the second event takes place through a sharp exothermic peak related to the crystallization of the metallic glassy phase. The differences between the crystallization temperature ($T_x$) and $T_g$ relates to the supercooled liquid region ($\Delta T_x$; $T_x$-$T_g$=61.18° C.).

The DSC scan of $MgH_2$ powders obtained after 6 hours of RBM (before mixing with the metallic glassy powders) reveals shoulder-like endothermic peaks, as shown in curve (B) of FIG. 4. The metastable phase of γ-$MgH_2$ tends to decompose at lower temperatures ($T_{\gamma\text{-}dec}$=434.17° C.), when compared with the decomposition temperature of β-$MgH_2$ ($T_{\beta\text{-}dec}$=462.75° C.). Both $T_{\gamma\text{-}dec}$ and $T_{\beta\text{-}dec}$ shifted to the low temperature side upon ball milling with metallic glassy $Zr_{70}Ni_{20}Pd_{10}$ powders for ten hours, and were recorded to be 416.95° C. and 434.17° C., respectively (curve (C) of FIG. 4). A significant decrease in the decomposition temperature (341.6° C.) for $MgH_2$ is found for the sample mixed with 5 wt % $Zr_{70}Ni_{20}Pd_{10}$ powders and milled for 50 hours, as shown in curve (D) of FIG. 4. This shows the outstanding effect of this composite for destabilizing the $MgH_2$ phase.

Figure 5A:
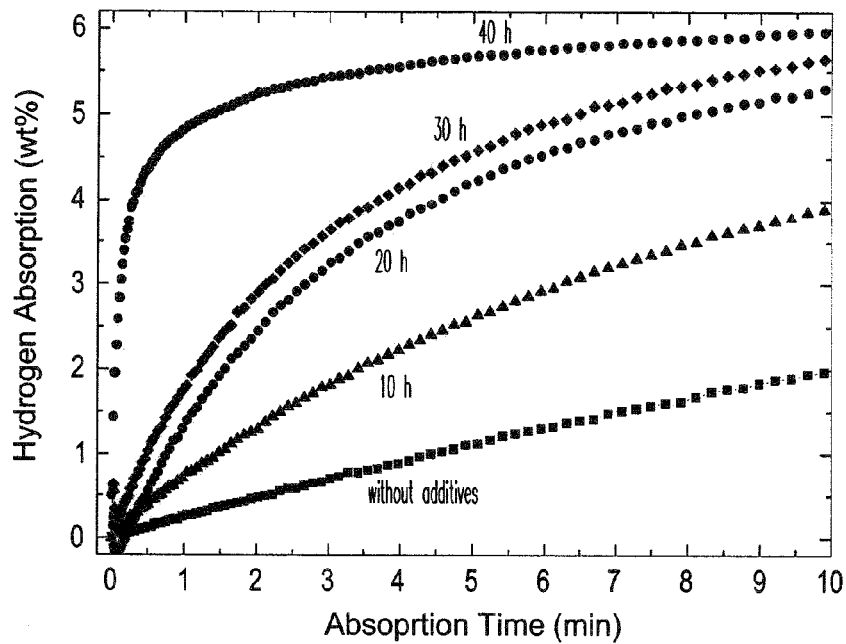
FIG. 5A is a graph showing the hydrogen absorption kinetics of $MgH_2$ powder at a temperature of 175° C.

One major problem restricting the potential applications of $MgH_2$ compounds in real fuel cell and energy storage applications is its very slow hydrogen uptake/release kinetics that require the application of a high temperature (above 400° C.) to be enhanced. For example, at 175° C., the as-synthesized $MgH_2$ powders obtained after six hours of RBM (without additives of metallic glassy powders) require 10 minutes to absorb about 2 wt % $H_2$, as shown in FIG. 5A. When $MgH_2$ is mixed with the metallic glassy powders and milled for 10 hours, a remarkable improvement on the absorption kinetics is achieved, indexed by an increase in the hydrogen amount absorbed within 10 minutes to 3.89 wt %.

Increasing the RBM time led to enhancement of the absorption kinetics, indexed by the absorbed amount hydrogen recorded for the samples obtained after 20 hours (5.26 wt %), and 30 hours (5.68 wt %). The sample obtained after ball milling with the metallic glassy powders for 40 hours shows outstanding hydrogenation kinetics, indicated by the very short time (~2 minutes) required to absorb ~5 wt % $H_2$. This sample reaches its maximum storage capacity (~5 wt % $H_2$) after only 9 minutes.

Figure 5B:
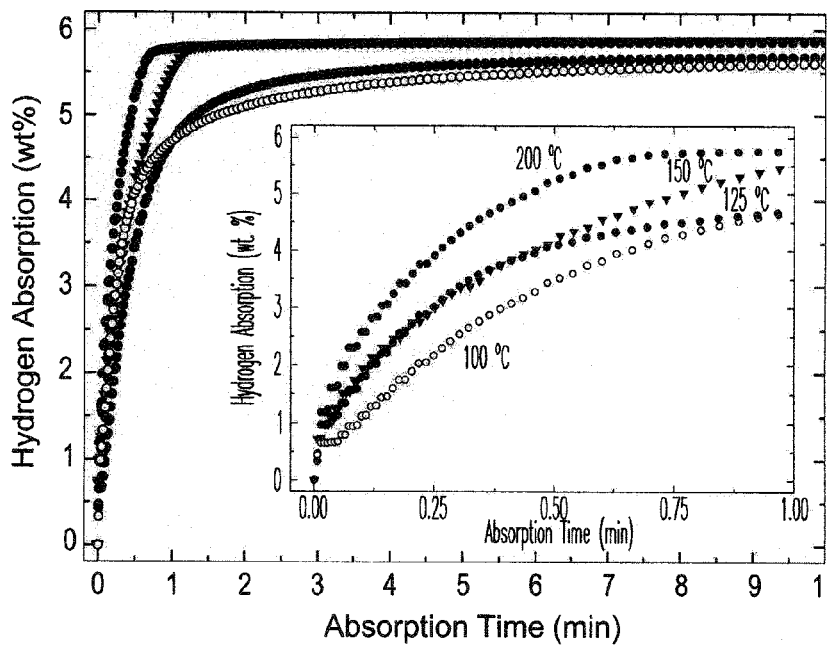
FIG. 5B is a graph showing the hydrogen absorption kinetics of the composition for hydrogen storage according to the present invention, at a temperature of 175° C., prepared by 50 hours of ball milling of the $Zr_{70}Ni_{20}Pd_{10}$ powder and $MgH_2$ powder.

FIG. 5B shows the temperature effect, ranging between 100° C. and 200° C., on the absorption kinetics of the composite powder obtained after 50 hours of RBM time. The relation between the absorbed hydrogen during the first minute of the experiment is shown in the inset of FIG. 5B. The composite powders show excellent hydrogenation characteristics, indexed by their high capability of absorbing hydrogen (~4.6 wt %) within a short time (1 minute) at low temperature (100° C.-125° C.), as shown in the inset of FIG. 5B. They reached their saturation values of 5.6 wt % $H_2$, after 6.5 minutes. Increasing the applied temperature to 150° C. improves the absorption kinetics, as suggested by the higher amount of hydrogen absorbed (~5.5 wt %) in 1 minute (inset of FIG. 5B). This sample reached its saturated capacity value of 5.8 wt % $H_2$ after about 1.18 minutes. Significant improvement is achieved at 200° C., when the sample reached a hydrogen capacity of 5.8 wt % within 0.75 minutes (inset FIG. 5B), and does not show any degradation upon increasing the absorption time to 10 minutes.

Figure 5C:
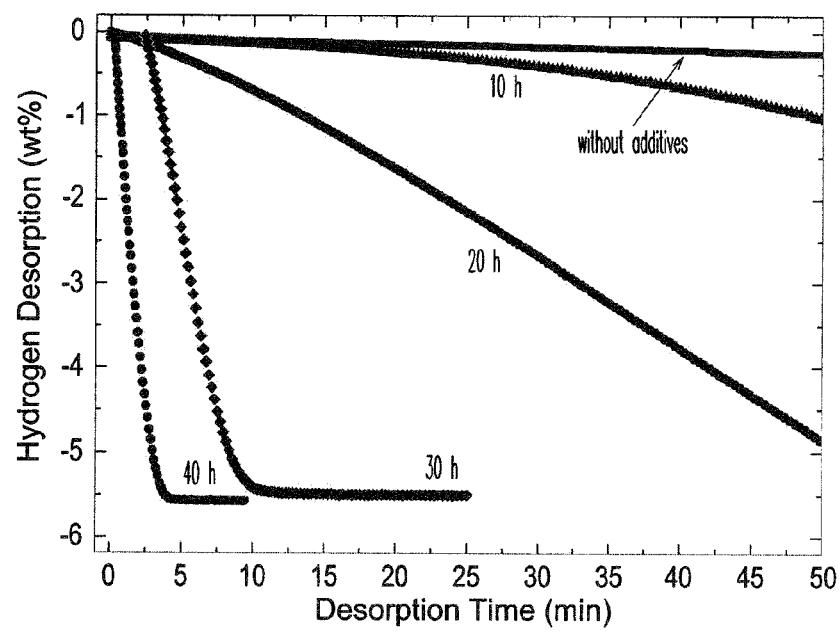
FIG. 5C is a graph showing the hydrogen desorption kinetics of $MgH_2$ powder at a temperature ranging from 100° C. to 200° C.

FIG. 5C shows the dependence of desorption kinetics for $MgH_2$, measured at 175° C. on the metallic glassy additive and RBM time. Initially, pure $MgH_2$ powders obtained after six hours of RBM time had poor desorption kinetics, indexed by the low value of hydrogen released (~0.35 wt %) after 50 minutes of desorption time. When $MgH_2$ was mixed with the metallic glassy powders and milled for 20 hours, better desorption kinetics were attained, as indicated by a higher $H_2$ desorbed value (~1 wt %) obtained after 50 minutes. Significant improvement of the desorbed kinetics is also realized for the composite sample obtained after 20 hours (4.88 wt % $H_2$/50 min) and 30 hours (5.6 wt % $H_2$/26 min). The composite sample powders obtained after 40 hours of RBM time showed excellent dehydrogenation characteristics, indexed by the very short time (4.6 minutes) required to release about 5.7 wt % $H_2$.

Figure 5D:
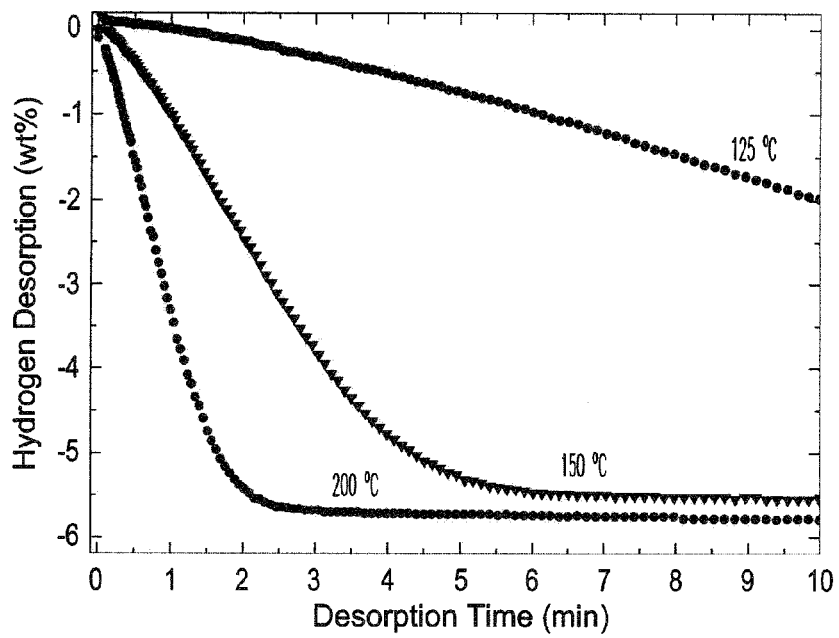
FIG. 5D is a graph showing the hydrogen desorption kinetics of the composition for hydrogen storage according to the present invention, at a temperature of 175° C., prepared by 50 hours of ball milling of the $Zr_{70}Ni_{20}Pd_{10}$ powder and $MgH_2$ powder.

The temperature effect on the desorption kinetics for the sample obtained after 50 hours of RBM time is shown in FIG. 5D. The composite powders examined at 125° C. desorbed about 2 wt % $H_2$ within 10 minutes, as shown in FIG. 5D. Increasing the applied temperature to 150° C. leads to enhancement of the dehydrogenation kinetic behavior, indicated by the shorter time (6.5 minutes) to release about 5.5 wt % $H_2$. This value is saturated at 5.6 wt % $H_2$ after 9.35 minutes. Significant enhancement for the desorption kinetics is attained for the sample measured at 200° C., showing a very short time (3.8 minutes) needed to release about 5.7 wt % $H_2$.

Figure 6:
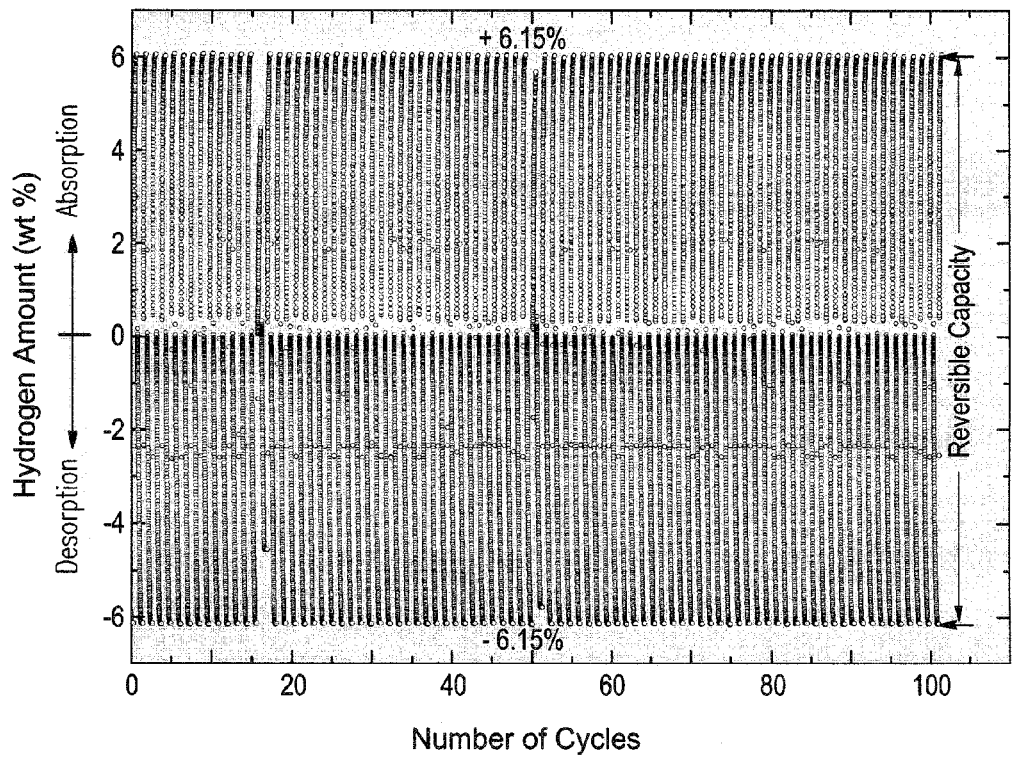
FIG. 6 is a graph showing hydrogenation/dehydrogenation quantities carried out over 100 successive repeated cycles for the composition for hydrogen storage according to the present invention.

The behavior of the composite powder (obtained after 50 hours of RBM time) for 100 continuous repetitions of hydrogenation/dehydrogenation was also studied at 200° C. under a hydrogen gas pressure ranging between 200 mbar and 10 bar. The powders were first activated by applying cyclic hydrogen gas sorption/desorption under a pressure of 35 bar at 325° C. for 20 continuous cycles. This treatment was necessary for surface cleaning of the powders and to break down the oxide phase for the surface. FIG. 6 shows the hydrogen absorbed/desorbed cycles achieved continuously for 100 repeated cycles at a temperature of 200° C. It should be emphasized that surface treatment of the powders led to improved hydrogen absorption, reaching 6.15 wt %, as shown in FIG. 6. No significant degradation in the hydrogen storage capacity could be detected, even after 100 cycles. The kinetics of hydrogenation/dehydrogenation remained constant with nearly constant absorption and desorption values of 6.15 wt %.

Figure 7A:
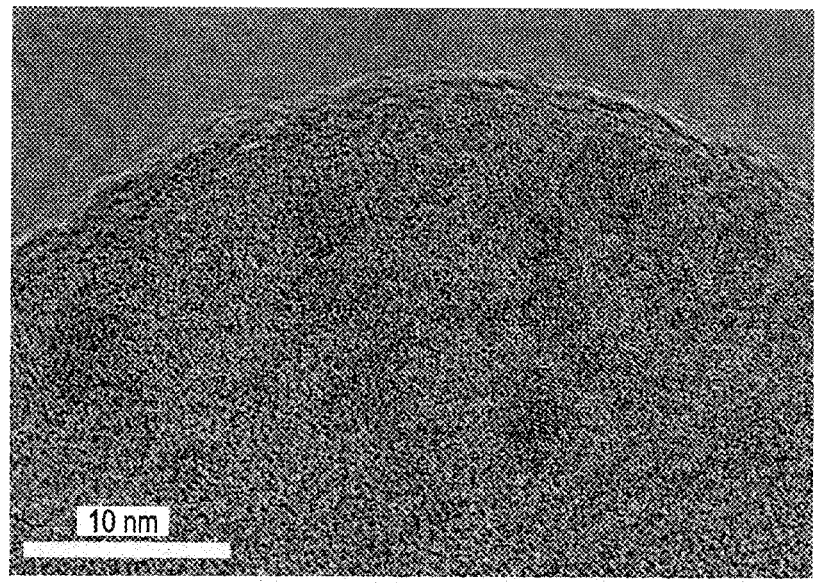
FIG. 7A is a high resolution transmission electron microscopy (HRTEM) image of the composition for hydrogen storage after the 100 successive repeated hydrogenation/dehydrogenation cycles of FIG. 6, shown at a 10 nm scale.
Figure 7B:
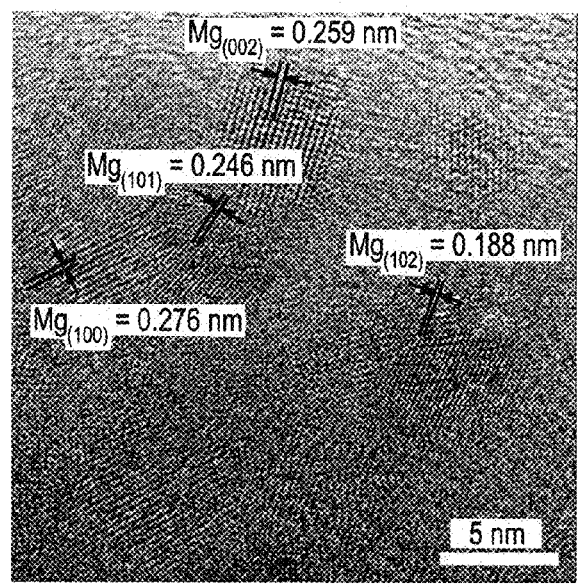
FIG. 7B is a high resolution transmission electron microscopy (HRTEM) image of the composition for hydrogen storage after the 100 successive repeated hydrogenation/dehydrogenation cycles of FIG. 6, shown at a 5 nm scale.

The HRTEM micrograph of the sample taken after the completion of 100 sorption/desorption cycles conducted at 200° C. is shown in FIG. 7A. The metallic glassy matrix maintained its maze-like morphology and contained fine grains (~5 nm in diameter). Selected grains are shown with a higher magnification (5 nm scale) in FIG. 7B. Clear lattice fringes can be seen from different grains in FIG. 7B, revealing the existence of a long-range order phase in the sample. The lattice fringes shown in FIG. 7B are regularly separated with different interplanar spacing (d). The Moiré-like fringes displayed in the micrograph with a d-spacing of 0.259 nm, 0.188 nm, 0.276 nm and 0.246 nm match well with the (002), (102), (100) and (101) lattice indexes of hcp-Mg, respectively. The absence of severe grain growth in the Mg grains after completion of cyclic tests can be attributed to the hard metallic glassy matrix that played the role of grain growth inhibitor. It is worth noting that the metallic glassy matrix maintains its short range ordered structure without any evidence of crystallization or the formation of medium-range ordered phases during the hydrogenation/dehydrogenation cycles. The thermal stability of the prepared metallic glassy phase described herein and the absence of phase transformations during the hydrogenation/dehydrogenation cycles suggests a sustainable hydrogen storage capacity with constant hydrogen uptake/releasing kinetics.

It is to be understood that the present invention is not limited to the embodiments described above, but encompasses any and all embodiments within the scope of the following claims.

I claim:

1. A composition for hydrogen storage, comprising $MgH_2$ powder and $Zr_{70}Ni_{20}Pd_{10}$ powder.

2. The composition for hydrogen storage as recited in claim 1, wherein the $Zr_{70}Ni_{20}Pd_{10}$ powder comprises about 5 wt % of the composition for hydrogen storage.

3. The composition for hydrogen storage as recited in claim 2, wherein individual grains of the $MgH_2$ powder each have a diameter ranging between 8 nm and 10 nm.

4. A method of making a composition for hydrogen storage, comprising the steps of:
   mixing $MgH_2$ powder and $Zr_{70}Ni_{20}Pd_{10}$ powder to form a powdered mixture; and
   performing reactive ball milling on the mixture to form a uniform, composite powder, the uniform composite powder forming the composition for hydrogen storage.

5. The method of making a composition for hydrogen storage as recited in claim 4, wherein the mixture includes about 5 wt % of the $Zr_{70}Ni_{20}Pd_{10}$ powder.

6. The method of making a composition for hydrogen storage as recited in claim 5, wherein the step of performing reactive ball milling on the powdered mixture is performed under about 50 bar of hydrogen gas atmosphere.

7. The method of making a composition for hydrogen storage as recited in claim 6, wherein the step of performing reactive ball milling on the mixture is performed for about 50 hours.

* * * * *